(12) United States Patent  
Takatsuki et al.

(10) Patent No.: US 6,722,264 B2
(45) Date of Patent: Apr. 20, 2004

(54) DRINK EXTRACTION APPARATUS

(75) Inventors: Toyohiko Takatsuki, Osaka (JP); Kazuhiro Nishikawa, Osaka (JP); Koji Yamafuji, Osaka (JP)

(73) Assignees: Zojirushi Corporation, Osaka (JP); Lucky Coffee Machine Co., Ltd., Hyogo (JP)

( * ) Notice: Subject to any disclaimer, the term of this patent is extended or adjusted under 35 U.S.C. 154(b) by 36 days.

(21) Appl. No.: 10/128,496

(22) Filed: Apr. 24, 2002

(65) Prior Publication Data

US 2002/0174775 A1 Nov. 28, 2002

(30) Foreign Application Priority Data

Apr. 24, 2001 (JP) ........................... 2001-125776
Nov. 14, 2001 (JP) ........................... 2001-348689
Nov. 19, 2001 (JP) ........................... 2001-353328

(51) Int. Cl.$^7$ ................................. A47J 31/00
(52) U.S. Cl. .................. 99/288; 99/279; 99/304; 99/323.3
(58) Field of Search .......................... 99/288, 290, 279, 99/299, 304, 306, 307, 323.3, 473, 476; 220/592.28, 592.22, 592.2; 165/104.34, 122, 121, 120, 918, 132

(56) References Cited

U.S. PATENT DOCUMENTS 6,286,415 B1 * 9/2001 Leung .......................... 99/288

FOREIGN PATENT DOCUMENTS

| JP | H5-70422 | 9/1993 |
| JP | 8038363 | 2/1996 |
| JP | 10146277 | 6/1998 |

* cited by examiner

Primary Examiner—Reginald L. Alexander
(74) Attorney, Agent, or Firm—Birch, Stewart, Kolasch & Birch, LLP

(57) ABSTRACT

The present invention is composed of a drink extraction portion, a drink container for storing drink extracted by the drink extraction portion, a heat retention chamber surrounding the drink container, a fan for supplying air to the heat retention chamber for air circulation, and a heater for heating air supplied to the heat retention chamber by the fan to make warm air, the warm air heating the drink container to keep drink therein warm.

23 Claims, 14 Drawing Sheets

Fig. 9
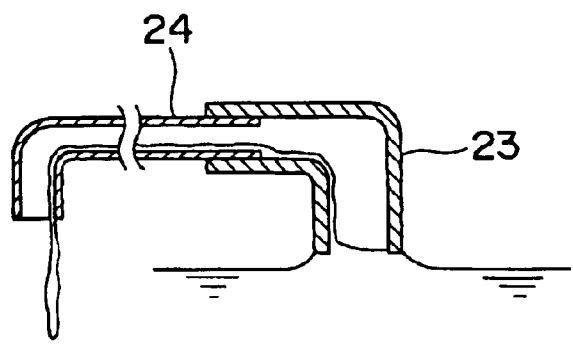
Fig. 10
(A)          (B)          (C)
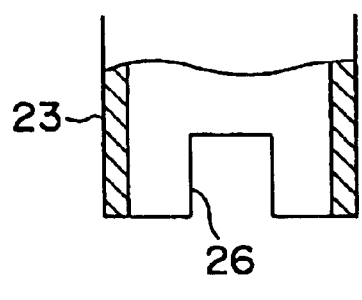 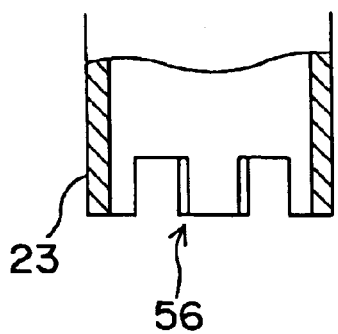 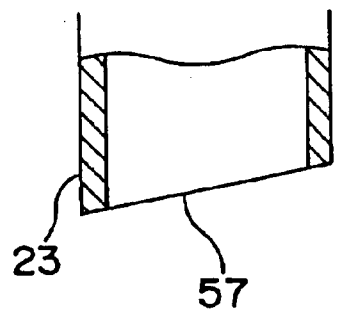

(A)    (B)

Measurement result of degradation level of coffee expressed by pH values

DRINK EXTRACTION APPARATUS

This nonprovisional application claims priority under 35 U.S.C. §119(a) on Patent Application Nos. 2001-125776; 2001-348689 and 2001-353328 filed in JAPAN on Apr. 24, 2001; Nov. 14, 2001 and Nov. 19, 2001 which are herein incorporated by reference.

BACKGROUND OF THE INVENTION

The present invention relates to a drink extraction apparatus for extracting drink such as coffee and black tea.

In a conventional drink extraction apparatus, the extract liquid extracted by pouring hot water over the powered coffee or black tea leaves placed in a bucket is stored in a drink container made of glass called decanter and kept warm therein. A typical method for keeping a drink container warm include a method for placing the drink container on a heat retention plate equipped with a heater.

In the keep-warm method with use of the heat retention plate, heat from the heater is directly conducted to extract liquid inside the decanter, which overheats the extract liquid and causes such problems as overboil of the extract liquid, thereby damaging flavor of the drink. In addition, the method has a defect that insufficient contact between the bottom surface of the decanter and the heat retention plate changes the correlation between the temperature of the heat retention plate and the temperature of the extract liquid inside the decanter, which disturbs keeping the drink warm at a specified temperature.

Japanese Utility Model Laid-Open Publication HEI No. 5-70422 has proposed a method for surrounding a decanter placed on a heat retention plate with a transparent heat retention cover together with a bucket to reduce power consumption of a heater. Although this method is capable of preventing heat discharge with the heat retention cover, the defect of the method with use of the heat retention plate is not at all corrected due to the very presence of the heat retention plate. Further, the heat retention cover requires detachment every time the decanter needs to be put in and out, which makes operation extremely intricate.

Japanese Patent Laid-Open Publication HEI No. 8-38363 has proposed a method for placing a decanter on a heat retention plate via a heat retention case to form a space layer between the heat retention plate and the bottom surface and outer lateral side of the decanter, for decreasing heat discharge from the decanter and reducing power consumption of a heater, as well as for providing uniform heat retention of the decanter via the space layer. This method, however, has a defect that the size of a main body of the apparatus is increased by the space layer provided between the heat retention plate and the decanter.

Further, Japanese Patent Laid-Open Publication HEI No. 10-146277 has proposed a method in which a coffee server is composed of a coffee receiver tank and a heat retention tank for surrounding the coffee receiver tank from outside, and hot-retained water is pouring in between the coffee receiver tank and the heat retention tank to heat the coffee in the coffee receiver tank with hot water and keep it warm. The method with hot water has defects that a water heating mechanism is required and the coffee server itself becomes larger and heavier.

A conventional drink extraction apparatus such as coffee makers has a feedwater tank having an upper opening for receiving water. The received water is fed from the feedwater tank to a water boiler tank, where the water is heated and delivered through a delivery pipe to the powdered coffee contained in a bucket, so that coffee liquid is extracted from the powdered coffee and is supplied to a drink container. A water receiving cover having a perforated portion is fastened to the opening of the feedwater tank with a screw for preventing dirt and the like contained in water from traveling the feedwater tank and reaching the water boiler tank. A cover plate of the water boiler tank is provided with a steam pipe disposed so as to protrude inside the feedwater tank for discharging water vapor generated in the water boiler tank.

However in the conventional drink extraction apparatus, the water receiving cover is fastened so that maintenance operation of the feedwater tank such as cleaning is not available, and therefore the feedwater tank tends to be unclean. In addition, a large amount of water vapor is discharged to outside through the steam pipe, which indicates that hot water inside the water boiler tank naturally evaporates and an amount thereof decreases, causing a problem that extraction of a specified amount of coffee liquid is not available.

SUMMARY OF THE INVENTION

It is an object of the present invention to provide a drink extraction apparatus capable of keeping extract liquid warm at a proper temperature without deteriorating the extract liquid during keeping it warm. It is another object of the present invention to provide a small-size drink extraction apparatus. It is still another object of the present invention to provide a drink extraction apparatus capable of controlling the temperature of extract liquid with safety.

It is a further object of the present invention to provide a drink extraction apparatus having a container housing case for facilitating insertion and extraction of a container with a grip.

It is a still further object of the present invention to provide a drink extraction apparatus for facilitating maintenance operation of a feedwater tank and for performing dew condensation of water vapor and returning the dew to a water boiler tank to reduce escape of water vapor.

In order to accomplish the above objects, the present invention provides a drink extraction apparatus comprising:
  a drink extraction portion;
  a drink container for storing drink extracted by the drink extraction portion;
  a heat retention chamber surrounding the drink container;
  a fan for supplying air to the heat retention chamber for air circulation; and
  a heater for heating air supplied to the heat retention chamber by the fan to make warm air,
  the warm air heating the drink container to keep drink therein warm.

In the drink extraction apparatus of the present invention as structured above, air sent by the fan is heated by the heater and supplied to the heat retention chamber, where air flows around the drink container to uniformly heat the drink container, and then returns to the fan and circulates. Thus, extract liquid in the drink container is kept warm at a proper temperature.

The heat retention chamber is preferably composed of a lateral wall surrounding the peripheral surface of the drink container, a bottom wall for receiving the bottom surface of the drink container, and an upper wall having an opening portion for covering the upper side of the drink container and falling extracted drink from the bucket to the drink container. Such structure makes it possible to prevent escape of heat wave as well as to uniformly heat the drink container from the periphery thereof.

On the lateral wall, there are preferably formed an air outlet for blowing out air sent from the fan toward the heat retention chamber, and an air inlet for sucking air in the heat retention chamber and returning the air to the fan. In such structure, air blown from the air outlet to inside of the heat retention chamber flows along the peripheral surface of the drink container through a space between the lateral wall and the drink container and flows out to the air inlet, thereby enabling smooth air circulation.

Part of air blown out from the air outlet is preferably directed toward the lower side of the drink container. This enables heat retention at a proper temperature even when the amount of extract liquid in the drink container is small.

Part of the lateral wall is preferably made of a door for putting the drink container in and out. The door may be a pair of right and left biparting doors. In the case of using the biparting doors, an opening portion for exposing a grip of the drink container outside is preferably formed in a joint portion of a pair of the right and left doors. This makes it easy to putting the drink container out of the heat retention chamber.

At least the lateral wall of the heat retention chamber preferably has a heat insulation structure. Here, the heat insulation structure may be an air layer. This enables control of heat discharge from the lateral wall. Further, structuring the lateral wall with a transparent material makes it possible to check the amount of drink in the drink container.

It is preferable to further provide a temperature sensor for detecting the temperature of air supplied to the heat retention chamber and a control unit for turning on and off the heater based on the temperature detected by the temperature sensor to control the temperature of air in the heat retention chamber. Here, the temperature sensor is preferably attached to a radiation fin provided on the heater or in the vicinity of the radiation fin. This enables the temperature sensor to detect abnormal heat generation of the radiation fin in the case of the fan failure and to turn off the heater, thereby securing safety.

Preferably, the door is mounted rotatably around a rotation axis, in the vicinity of which an inner door is extensively provided so as to protrude inside a container housing case when the door is closed and to cover the opening portion of the container when the door is opened. A notch is provided on the door for allowing the grip of the container to protrude outside.

According to the container housing case, for putting the container with a grip out of the container housing case, the grip protruding to the outside is held through the notch of the container housing case and dragged. Consequently, the outside surface of the container presses the inside surface of the door, so that the door opens as the container is dragged, which enables extraction of the container. In the state of the container being put out, the opening portion of the container housing case is closed by the inner door. For putting the container with a grip in the container housing case, the grip is held to press the container against the inner wall. Consequently, the door is closed as the container is pressed, which enables insertion of the container in the container housing case.

The inner door may be in the shape of a cylinder or a board. In the case where the inner door is in a cylinder shape, the structure thereof is simple and the weight thereof is small. In the case where the inner door is in a board shape, the plate shaped inner door may block the inside and outside of the container housing case when the door is opened. The container housing case is preferably provided with a double wall made of two plates facing each other with an air layer interposed therebetween. Such structure enables control of heat discharge from the side wall.

On the inner wall of the container housing case, a straightening vane is preferably provided for guiding warm air to flow along the periphery of the container. Such structure implements smooth warm air flow and sufficient heat retention or cold insulation of the container.

The drink extraction portion is preferably composed of a feedwater tank, a water boiler tank having a heater, a feedwater pipe for connecting the water boiler tank and the feedwater tank, a bucket provided above the drink container for accommodating an extract, and a discharge pipe for discharging hot water from the water boiler tank into the bucket. The heat retention chamber is preferably provided under the bucket, and the fan and the heater are preferably provided behind the heat retention chamber and under the water boiler tank. Such configuration enables effective use of space under the water boiler tank and removal of a heat retention plate and a heater portion under the drink container to decrease the overall height of the apparatus, resulting in downsizing.

It is preferable that the drink extraction portion is further composed of a steam pipe extending to the upper side from the water boiler tank and protruding inside the feedwater tank, the feedwater tank has an opening opened upwardly for receiving water, a water receiving cover having a perforated portion for allowing received water to pass therethrough is mounted in a demountable way on the feedwater tank so as to cover the opening of the feedwater tank, and the water receiving cover is provided with a small chamber opened downwardly for covering the upper side of the steam pipe. Such structure makes it possible to demount the water receiving cover to perform maintenance operation of the feedwater tank such as cleaning. Water vapor generated in the water boiler tank travels through the stem pipe and reaches the small chamber of the water receiving cover, where dew condensation occurs and resultant dew flows down into the feedwater tank and returns to the water boiler tank.

Above the perforated portion of the water receiving cover, a filter for filtering received water is disposed. This enables removal of small dirt, dust, bleaching powder, and the like contained in water received in the water boiler tank.

A recessed portion is provided on the water receiving cover to form the perforated portion on the bottom of the recessed portion. This makes it possible to prevent water received in the feedwater tank from splashing.

On the peripheral verge of the water receiving cover, there is provided a leg portion extending downside, the lower end of which is brought into contact with the bottom of the feedwater tank. This facilitates mounting of the water receiving cover.

On the outer surface of the leg portion of the water receiving cover, an engagement groove extending in vertical direction is provided, and a protruding bar for engaging with the engagement groove is provided in a protruding way on the lateral wall of the feedwater tank. This makes it possible to prevent the water receiving cover from moving in horizontal direction. The engagement groove is preferably formed to have a width narrowed toward the lower side. An opening verge of the engagement groove is preferably provided with a protruding portion that is tightly fitted into the protruding bar.

An engagement protruding portion is provided on the outer surface of the leg portion of the water receiving cover, and a protrusion for engaging with the engagement protruding portion is provided in a protruding way on the lateral wall of the feedwater tank. This makes it possible to prevent the water receiving cover from moving in vertical direction.

BRIEF DESCRIPTION OF THE DRAWINGS

Further objects and advantages of the present invention will become clear from the following description taken in conjunction with the preferred embodiments thereof with reference to the accompanying drawings, in which:

FIG. 8A is a partial plane view showing an engagement groove of the water receiving cover of FIG. 1 in engagement with a protruding bar of the feedwater tank, while FIG. 8B is a cross sectional view showing an engagement protruding portion of the water receiving cover of FIG. 1 in engagement with a protruding portion of the feedwater tank;

FIG. 9 is a cross sectional view showing a discharge pipe of a conventional coffee extraction apparatus in the state of discharging a small amount of hot water;

FIG. 10 is a partially broken front view showing the shape of the lower end of an L-shaped tube included in a discharge pipe of the coffee extraction apparatus of FIG. 1;

FIG. 11A is a cross sectional view of a shower cap of the coffee extraction apparatus of FIG. 1, while FIG. 11B is a partially enlarged cross sectional view of FIG. 11A;

FIG. 12 is a bottom view of the shower cap of FIG. 11;

DETAILED DESCRIPTION OF THE PREFERRED EMBODIMENTS

First, the embodiment of a drink extraction apparatus of the present invention will be described with reference to accompanying drawings.

Figure 1:
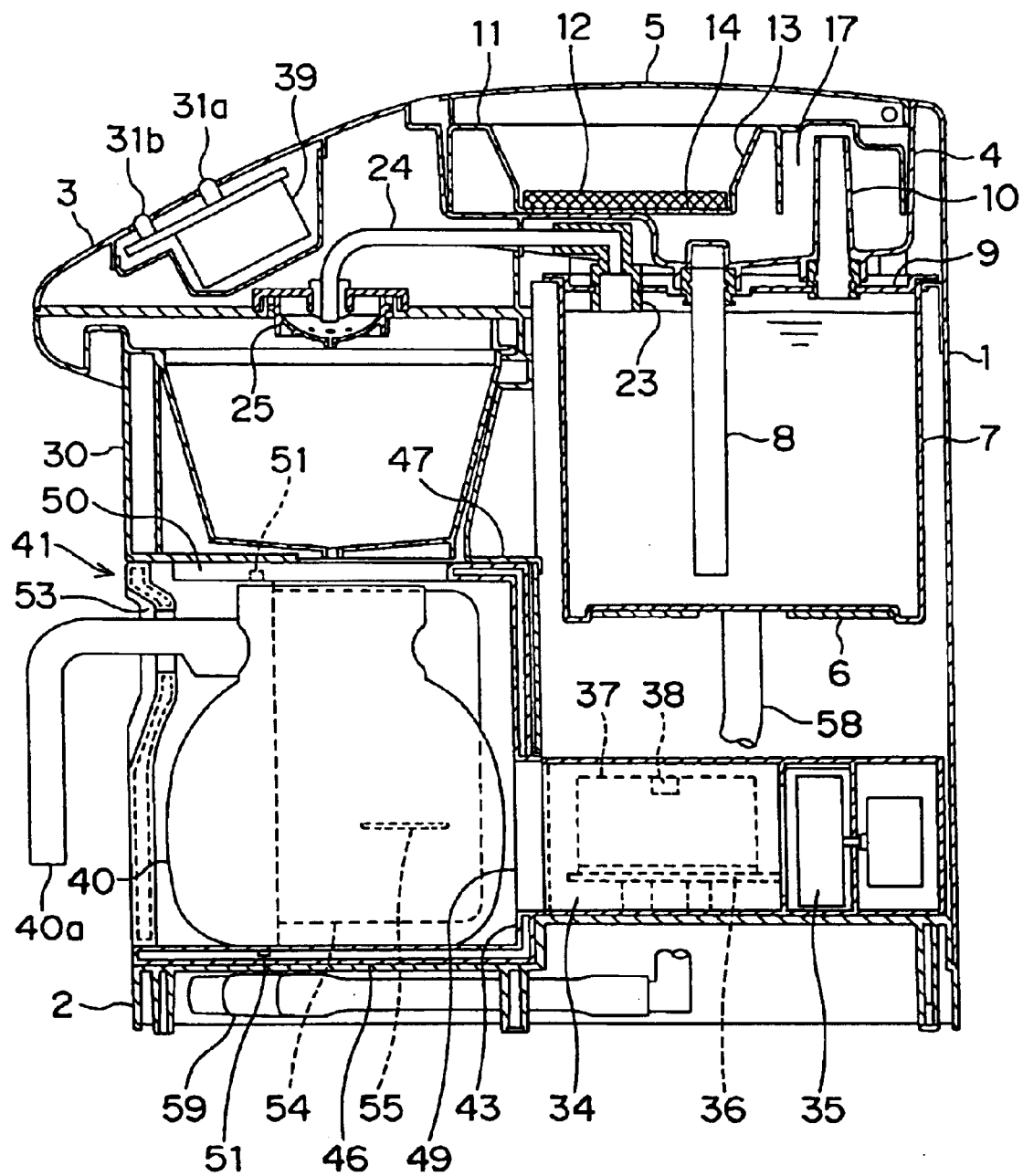
FIG. 1 is a cross sectional view showing a coffee extraction apparatus according to the present invention.

FIG. 1 shows a coffee extraction apparatus according to the present invention. A main body 1 of the coffee extraction apparatus includes a base portion 2 protruding onward from the lower front side of the main body 1, and a nose portion 3 protruding onward from the upper front side of the main body 1.

On the upper side of the main body 1, there is provided an approximately rectangle feedwater tank 4 whose top side is openable, and the feedwater tank 4 is closed by a cover member 5. On the lower side of the feedwater tank 4, there is provided a water boiler tank 7 having a water boiler heater 6. To the bottom of the feedwater tank 4, the top end of a feedwater pipe 8 is connected. The feedwater pipe 8 is inserted into the water boiler tank 7 through a cover plate 9 of the water boiler tank 7 and extended toward the vicinity of the bottom thereof, for feeding water in the feedwater tank 4 to the water boiler tank 7. On the cover plate 9, a steam pipe 10 is disposed so as to protrude inside the feedwater tank 4, thereby preventing natural exhalation during water boiling.

Figure 3:
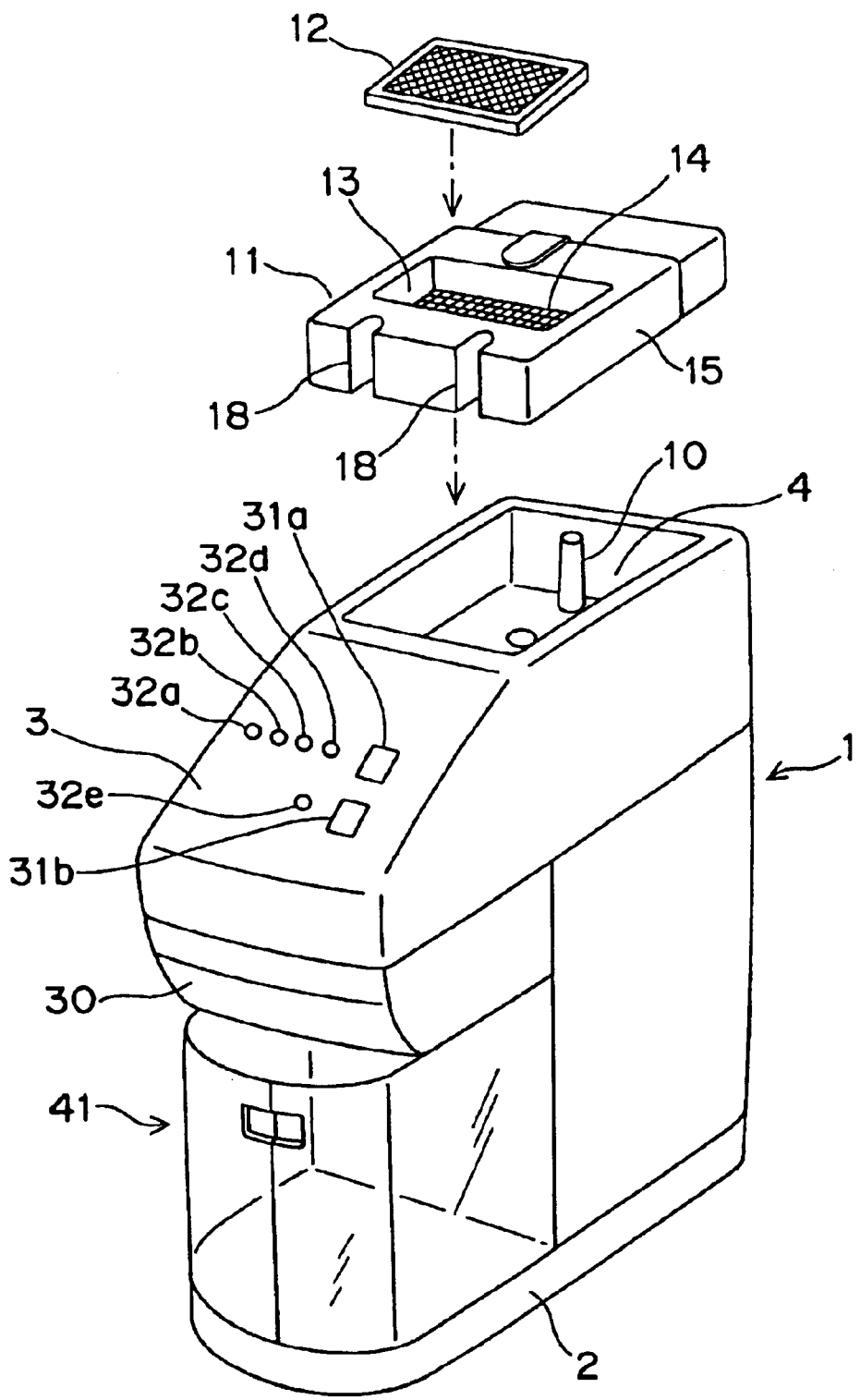
FIG. 3 is an exploded perspective view showing the coffee extraction apparatus of FIG. 1.
Figure 4:
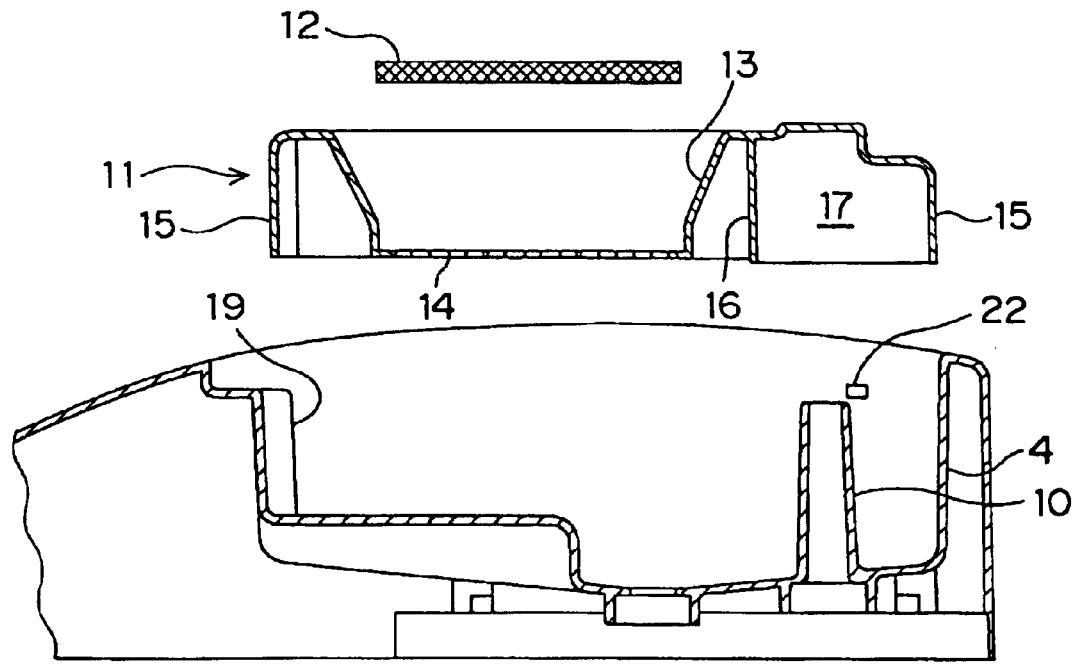
FIG. 4 is a cross sectional view showing a feedwater tank with a water receiving cover and a filter being demounted.
Figure 5:
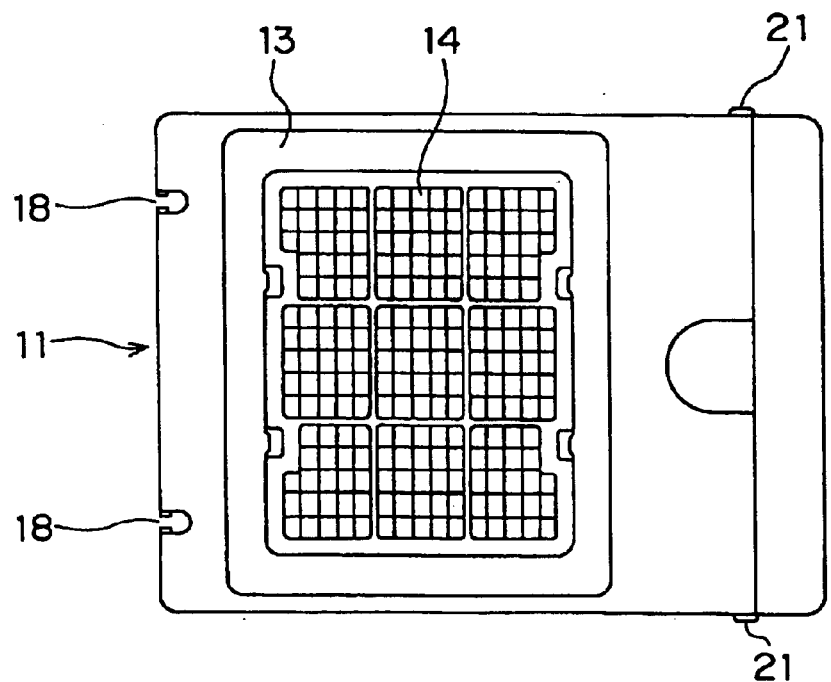
FIG. 5 is a plane view showing the water receiving cover of FIG. 1.
Figure 6:
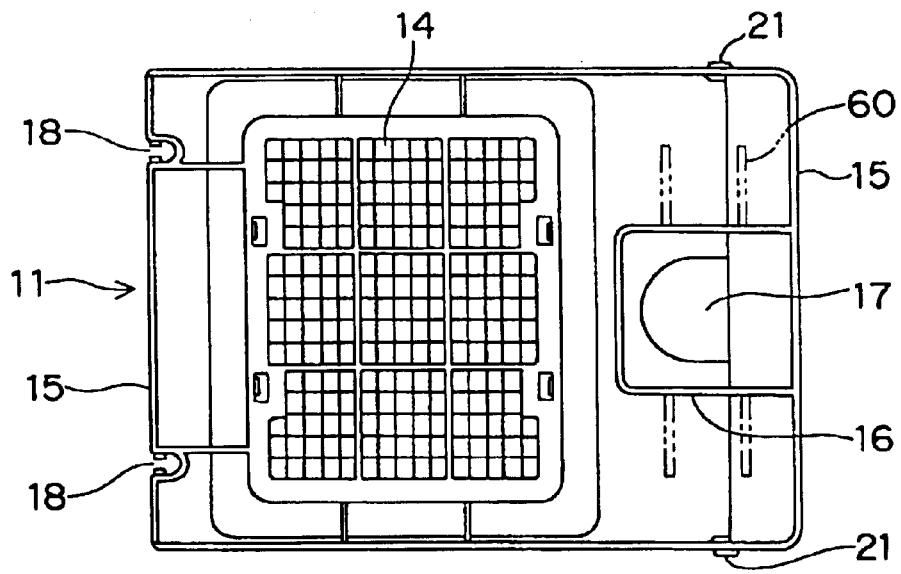
FIG. 6 is a bottom view showing the water receiving cover of FIG. 5.

In the feedwater tank 4, as shown in FIG. 3, a water receiving cover 11 and a filter 12 are housed from the upper opening thereof. The water receiving cover 11 has a shape of rectangle, which is almost identical to the shape of the opening of the feedwater tank 4. On the upper surface of the water receiving cover 11, a recessed portion 13 is formed, and on the bottom of the recessed portion 13, a meshed perforated portion 14 is formed as shown in FIG. 5. On the peripheral verge of the water receiving cover 11, there is formed a leg portion 15 extending downwardly, the lower end of which comes into contact with the bottom of the feedwater tank 4. On the inner surface of the water receiving cover 11, as shown in FIG. 6, the both sides of a U-shaped partition 16 are connected to the leg portion 15 so as to form a small chamber 17 which is opened downwardly for covering the upper side of the steam pipe 10.

Figure 7:
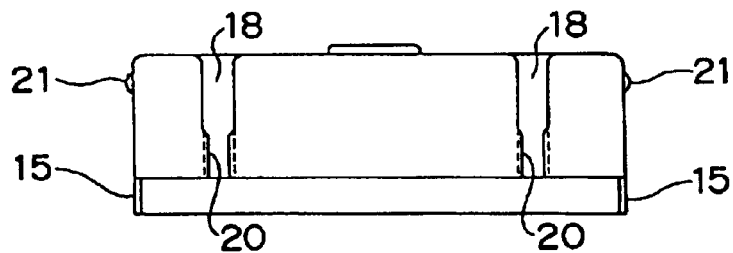
FIG. 7 is a frontal side view showing the water receiving cover of FIG. 5.
Figure 8:
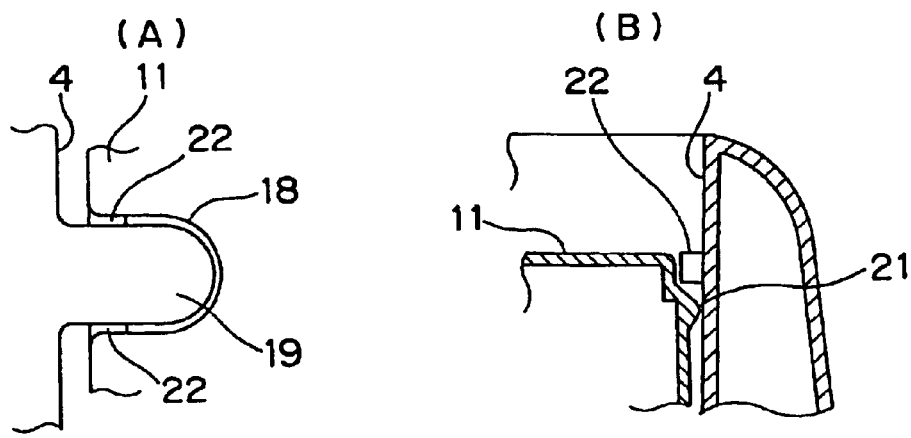
Figure 1:
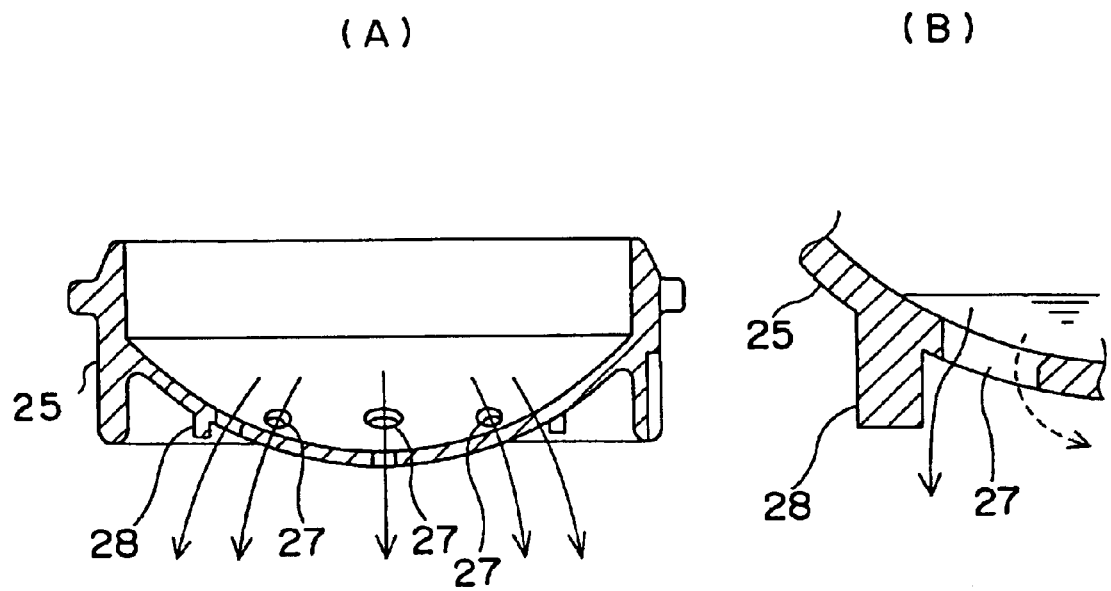
Figure 1:
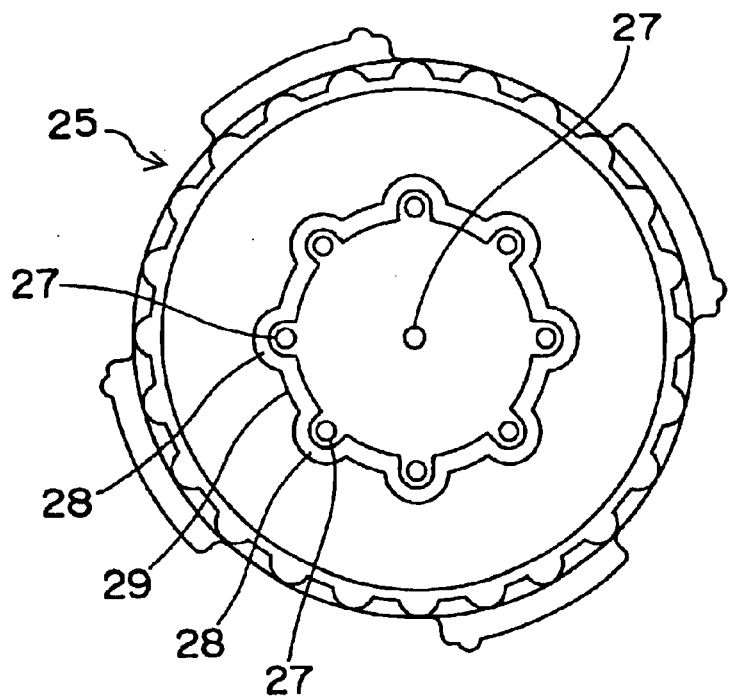
Figure 13:
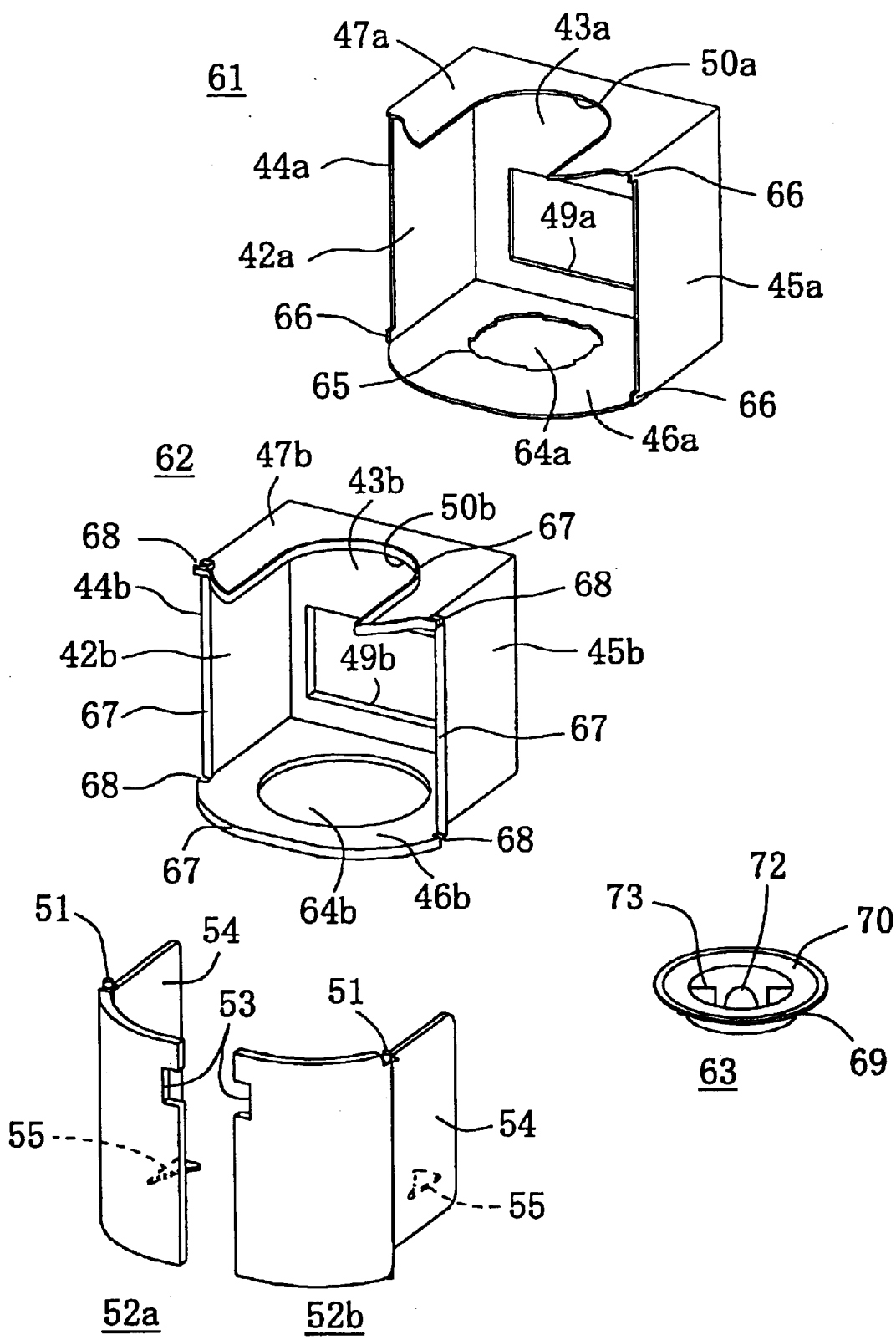
FIG. 13 is an exploded perspective view showing a container housing case of the coffee extraction apparatus of FIG. 1.

On the outer surface of the front side of the leg portion 15, there is provided an engagement groove 18 extending in vertical direction as shown in FIG. 7. As shown in FIG. 8A, the engagement groove 18 is brought into engagement with a protruding bar 19 provided in a protruding way on the lateral wall of the feedwater tank 4 when the water receiving cover 11 is housed in the feedwater tank 4. The engagement groove 18 is formed to have a width narrowed toward the lower side. The verge of an opening thereof is provided with a protruding portion 20 that is tightly fitted into the protruding bar 19. Further, on the outer surface of the both sides of the leg portion 15, an engagement protruding portion 21 is provided. As shown in FIG. 8B, the engagement protruding portion 21 is brought into engagement with a protrusion 22 provided in a protruding way on the lateral wall of the feedwater tank 4 when the water receiving cover 11 is housed in the feedwater tank 4.

With reference again to FIG. 1, a discharge pipe 24 is attached to the cover plate 9 of the water boiler tank 7 via an L-shaped rubber tube 23. The lower end of the rubber tube 23 of the discharge pipe 24 is dipped into water in the water boiler tank 7, while the other end is extended toward the nose portion 3 and opened downwardly toward the shower cap 25 for discharging hot water in the water boiler tank 7 into a later-described bucket 30 by siphonage. The lower end of the rubber tube 23 of the discharge pipe 24 is given a U-shaped notch 26 as shown in FIG. 10. The bottom of the shower cap 25 is, as shown in FIG. 11, formed to be a downward convex sphere, and discharge outlets 27 are provided in the center of the bottom and in the periphery thereof. As shown in FIG. 12, in the radial outer verge of each peripheral discharge outlet 27, there are formed semi-circular arc ribs 28, each of which is continued via a junction 29.

On the lower side of the nose portion 3, a bucket 30 for accommodating coffee powder is mounted in a demountable way. On the upper surface of the nose portion 3, there are provided, as shown in FIG. 3, a boiling ON/OFF switch 31a for switching ON/OFF of the water boiler heater 6, a heat retention ON/OFF switch 31b for switching ON/OFF of a later-described fan 35 and an air heater 36, a red LED light 32a for indicating boiling without water, a red LED light 32b for indicating boiling, a green LED light 32c for indicating optimum temperature, a red LED light 32d for indicating extraction, and a yellow LED light 32e for indicating heat retention.

Figure 2:
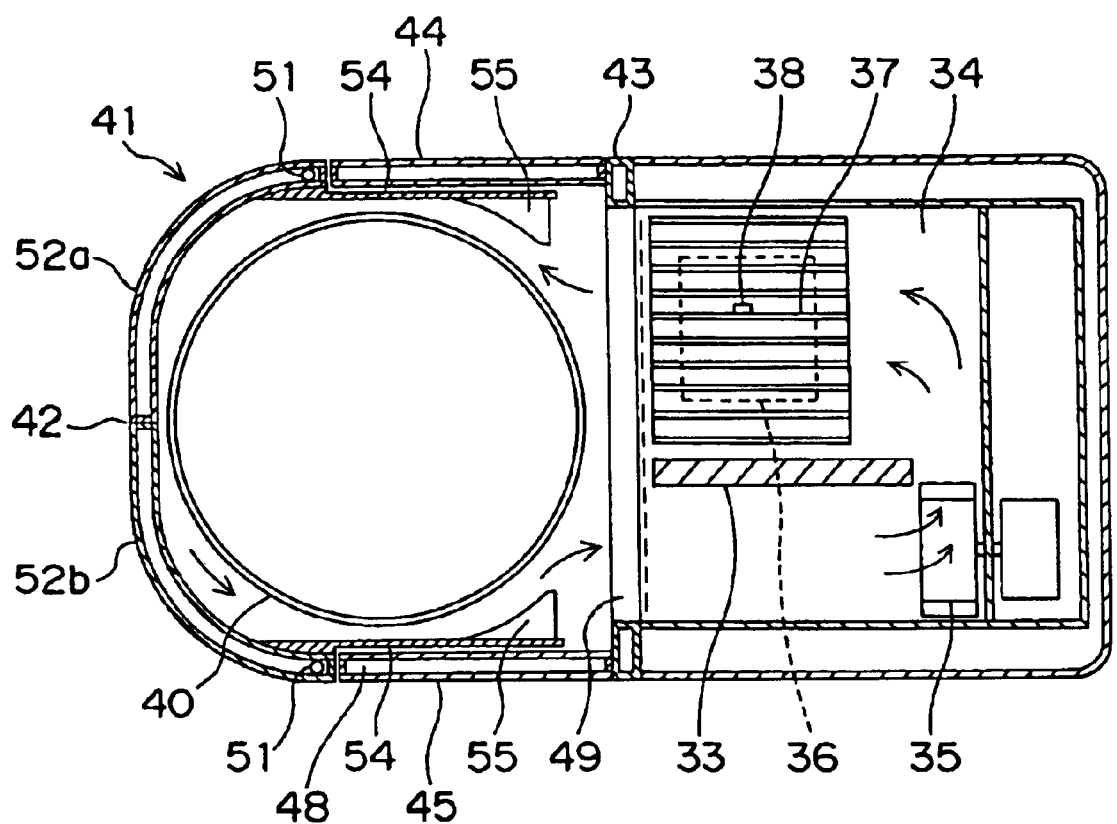
FIG. 2 is a horizontal cross sectional view showing the coffee extraction apparatus of FIG. 1.

Below the main body 1, there is formed, as shown in FIG. 2, a circulation chamber 34 formed to be a plane U-shape by a partition plate 33. In the circulation chamber 34, there are provided a fan 35 for supplying air to a later-described container housing case 41 for air circulation, and an air heater 36 for heating air to be supplied by the fan 35. The air heater 36 has a plurality of radiation fins 37 along the flow of supplied air. The radiation fin 37 is equipped with a temperature sensor 38 for detecting temperature of air flowing along the radiation fin 37. Inside the nose portion 3, there is provided a control unit 39 for switching ON/OFF of the water boiler heater 6 to perform boiling and heat retention of water in the water boiler tank 7, controlling drive of the fan 35, and controlling ON/OFF operation of the air heater 36 based on a temperature detected by the temperature sensor 38.

Below the bucket 30 and above the base portion 2, there is provided in a demountable way a container housing case 41 for housing a decanter 40 that is a glass-made container with a grip 40a.

The container housing case 41 is an approximately rectangle box which is provided with an opening portion 42 on the front side for allowing insertion and extraction of the decanter 40, and composed of three lateral walls including a rear-side wall 43, a left-side wall 44, and a right-side wall 45 for surrounding the rear side and the right and left sides of the decanter 40, a bottom wall 46 for receiving the bottom face of the decanter 40, and an upper wall 47 for covering the top of the decanter 40. Each of the walls 43 to 47 is composed of a double wall made of two transparent synthetic resin plates facing each other with an air layer 48 interposed therebetween. The air layer 48 insulates inside and outside of the container housing case 41. On the rear-side wall 43, there is formed an opening portion 49 that is connected to the circulation chamber 34. On the upper wall 47, there is formed a U-shaped opening portion 50 for coffee liquid to drain away from the bucket 30 into the decanter 40.

As shown in FIG. 2, the opening portion 42 of the container housing case 41 may be opened and closed in a biparting manner by a pair of right and left doors 52a, 52b disposed so as to be rotatable around a rotation axis 51. The right and left doors 52a, 52b have a shape curved from a joint portion toward the both sides thereof. In the joint portion of the right and left doors 52a, 52b, there is formed a notch 53 for exposing the grip 40a of the decanter 40 to the outside.

In the vicinity of the rotation axis 51 of the doors 52a, 52b, there is extensively provided an inner door 54 which will project inside the container housing case 41 and become parallel to the right and left side walls 44 and 45 when the doors 52a, 52b are closed and which will close the opening portion 42 of the container housing case 41 when the doors 52a, 52b are opened. On the inner surface of the inner door 54, there is provided in a protruding way an approximately triangle straightening vane 55. The verge of the straightening vane 55 is formed so as to go along the peripheral surface of the decanter 40 housed in the container housing case 41.

The container housing case 41 is a transparent container housing case made of synthetic resin composed of an outer case 61, an inner case 62, a pair of right and left doors 52a, 52b, and a tray 63.

The outer case 61 is an approximately rectangle box with an opening portion 42a on the front side thereof, consisting of an upper wall 47a with a U-shaped opening portion 50a opened onward, a rear wall 43a with a rectangle opening portion 49a, and a bottom wall 46a with a circular opening portion 64a, on the verge of which a quartered circumferential notch 65 is formed. At four corners of the opening portion 42a of the outer case 61, there is formed a protruding piece 66 extending from the both side walls 44a and 45a.

The inner case 62 is an approximately rectangle box with an opening portion 42b on the front side thereof, whose overall configuration is slightly smaller than the outer case 61. There are formed a U-shaped opening portion 50b having the same shape as the opening portion 50a of the outer case 61 on the upper wall 47b of the inner case 62, a rectangle opening portion 49b having the same shape as the opening portion 49a of the outer case 1 on the rear wall 43b, and a circular opening portion 64b that is larger than the opening portion 64a of the outer case 1 on the bottom wall 46b. On each of front ends of the both side walls 44b, 45b of the inner case 62, a front end of the upper wall 47b, a peripheral verge of the opening portion 50b on the upper wall 47b, a front end of the bottom wall 46b, and a verge of the opening portion 49b on the rear wall 43b, there is provided in a protruding way an end plate 67 for closing space between each respective portion of the outer case 1. At four corners of the opening portion 42b on the inner case 62, there is formed a U-shaped hinge receiving portion 68 that is opened toward the lateral side.

A pair of the right and left doors 52a, 52b has a shape arched onward, and a rectangle notch 53 is formed in a joint thereof. In the vertical end of the verge opposite to the joint, a rotation axis 51 is provided in a protruding way. From the vicinity of a line connecting the vertical rotation axis 51 toward the rear side, that is, along the lateral wall of the outer case 61 and the inner case 62, there is formed a rectangle inner door 54. On the inner surface of the inner door 54, an approximately triangle straightening vane 55 is provided in a protruding way. The verge of the straightening vane 55 is formed so as to go along the peripheral surface of the decanter 40 housed in the container housing case 41.

Figure 15:
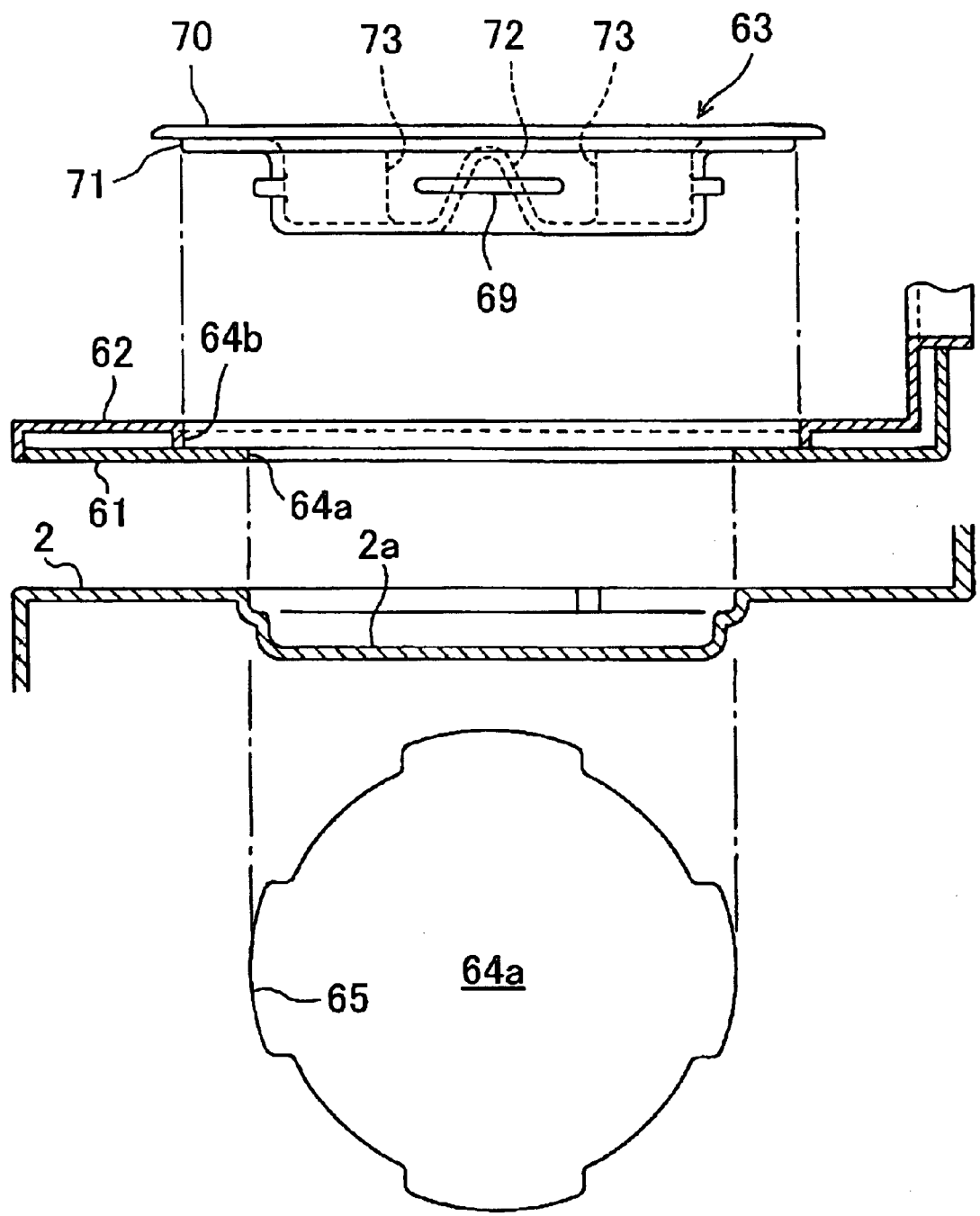
FIG. 15 is an enlarged cross sectional view showing the structure of the container housing case of FIG. 13 being fixed.

As shown in the drawing, the tray 63 is in the shape of an ashtray, the peripheral surface of which has a diameter fitted into the opening portion 64a on the bottom wall 46a of the outer case 61. As shown in FIG. 15, on the peripheral surface thereof, there is provided in a protruding way a rib 69 fitted into the notch 65 of the opening portion 64a on the bottom wall 46a of the outer case 61. On the back surface of a brim portion 70, there is formed a step portion 71 that is fitted into the opening portion 64b on the bottom wall 46b of the inner case 62. Inside the tray 63, there are provided a protruding portion 72 in the middle and a pair of tabs 73 on the inner circumference in a protruding way.

The opening portion 50 formed from the opening portions 50a, 50b on the upper walls 47a, 47b of the outer case 61 and the inner case 62 is designed to cover the top of the decanter 40 and to fall drink extracted from the bucket 30 into the decanter 40.

The opening portion 49 formed from the opening portions 49a, 49b on the rear-side walls 43a, 43b of the outer case 61 and the inner case 62 leads to the circulation chamber 34 as shown in FIG. 2.

Figure 14:
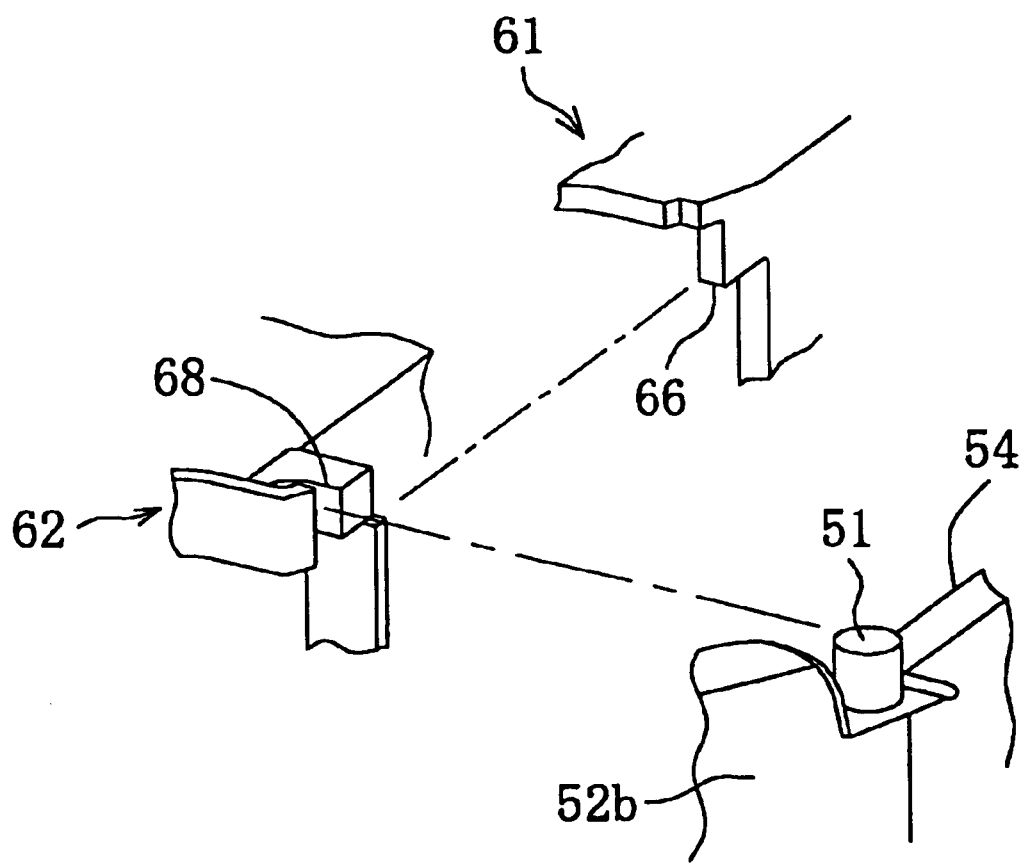
FIG. 14 is an enlarged perspective view showing a hinge portion of the container housing case of FIG. 13.

For assembling the container housing case 41 composed of the outer case 61, the inner case 62, a pair of the right and left doors 52a, 52b, and the tray 63, first, as shown in FIG. 14, the rotation axis 51 of a pair of the right and left doors 52a, 52b is engaged with the hinge receiving portion 68 of the inner case 62, and in this state the inner case 62 is inserted into the outer case 61. Here, since the opening of the hinge receiving portion 68 of the inner case 62 is covered with the protruding piece 66 of the outer case 61, the rotation axis 51 is surrounded by the hinge receiving portion 68 and the protruding piece 66, which prevents detachment of the rotation axis 51. The inner case 62 inserted into the outer case 61 forms an air layer 48 between the outer case 61 and inner case 62. Next as shown in FIG. 15, the tray 63 is inserted into the container housing case 41, fitted into the opening portion 64a on the bottom wall 46a of the outer case 61, and rotated. Consequently, the rib 69 of the tray 63 is engaged with the verge of the opening portion 64a on the bottom wall 46a of the outer case 61, which prevents detachment of the tray 63 as well as prevents detachment of the inner case 62 from the outer case 61.

Thus-assembled container housing case 41 is mounted on the base portion 2 of the main body 1, and the bottom of the tray 63 protruding from the bottom wall is fitted into a recessed portion 2a of the base portion 2 for positioning and fixation. It is noted that the tray 63 is easily detached by reverse rotation, which enables disposal or cleaning of residual liquid fallen from the decanter 40 or the bucket 30 and accumulated therein.

Next description discusses operation of the coffee extraction apparatus structured as stated above.

First, a specified amount of coffee powder is put in the bucket 30, and the bucket 30 is attached to the lower side of the nose portion 3, while a pair of the right and left doors 52a, 52b of the container housing case 41 is opened to place the decanter 40 in the container housing case 41. At this point, the grip 40a of the decanter 40 is positioned outside of the opening portion 42 of a pair of the right and left doors 52a, 52b. Then, water is supplied to the feedwater tank 4, and via the feedwater pipe 8, water is filled in the water boiler tank 7. Here, dust, particles, dirt, bleaching powder, and the like contained in water are filtered by the filter 12 mounted on the recessed portion 13 of the water receiving cover 11. Without the filter 12 mounted, dust contained in water is removed by the perforated portion 14.

Since the water receiving cover 11 has a recessed portion 13, pouring water in the recessed portion 13 prevents water from scattering around. Also, the water receiving cover 11 has the engagement groove 18 on the leg portion 15 engaged with the protruding bar 19 of the feedwater tank 4, and has the engagement protruding portion 21 engaged with the protrusion 22 of the feedwater tank 4, which prevents the water receiving cover 11 from moving during water feeding. The water receiving cover 11 may be demounted from the feedwater tank 4 for washing the water receiving cover 11 or cleaning the feedwater tank 4, which facilitates maintenance operation and makes it possible to keep them clean.

After feeding water, turning on the boiling ON/OFF switch 31a sets the water boiler heater 6 to ON, by which water in the water boiler tank 7 is heated to a specified temperature. At the same time, turning on the heat retention ON/OFF switch 31b drives the fan 35, by which the air heater 36 is turned on. This generates flow of air in the circulation chamber 34, and the air is heated by the radiation fin 37 of the air heater 36 to be a warm air, which is blown to the container housing case 41 for warming the decanter 40.

Water vapor generated in the water boiler tank 7 travels through a steam pipe 24 to the feedwater tank 4, and reaches a small chamber 17 formed on the water receiving cover 11 above the steam pipe 10. Consequently, water vapor condenses on the inner surface of the small chamber 17, flows down into the feedwater tank 4, and returns to the water boiler tank 7. This eliminates water vapor discharged from the coffee extraction apparatus to the outside, and eliminates natural evaporation of hot water in the water boiler tank 7, thereby enabling extraction of a specified amount of drink. It is noted that a fin 60 may be provided on the partition 16 of the small chamber 17 as shown by alternate long and two short dashes lines in FIG. 6 to cool water vapor faster for promoting dew condensation.

Next, when water is fed to the feedwater tank 4 again, hot water in the water boiler tank 7 is replaced by water, and poured into coffee powder in the bucket 30 through the discharge pipe 24 and the shower cap 25 by siphonage. As a result, coffee liquid is extracted from the bucket 30, and stored in the decanter 40.

When replacement of water and hot water is close to an end and an amount of hot water to be discharged becomes small, a conventional coffee extraction apparatus suffers bad break of hot water from the discharge pipe 24 since surface tension makes the liquid surface to suck onto the lower end of the rubber tube 23 even when hot water level in the water boiler tank 7 becomes lower than the lower end of the rubber tube 23 of the discharge pipe 24 as shown in FIG. 9. In the present embodiment, as shown in FIG. 10A, a notch 26 is formed on the lower end of the rubber tube 23, which prevents the liquid surface from sucking onto the lower end of the rubber tube 23 due to surface tension, thereby providing good break of hot water. It is noted that the notch 26 may be replaced by a concave and convex 56 as shown in FIG. 10B or an inclined face 57 as shown in FIG. 10C.

In addition, when an amount of hot water to be discharged from the discharge pipe 24 to the shower cap 25 becomes small, a conventional apparatus has such problem that as shown by dashed lines in FIG. 11B, hot water will not fall down from each peripheral discharge outlet 27, but goes along the lower surface of the shower cap 25 toward the center and falls down from the central discharge outlet 27, as a result of which hot water is not scattered over the coffee powder. In the present embodiment, however, the rib 28 is provided in the vicinity of the external radial verge of the peripheral discharge outlets 27, which guides water into the rib 28 as shown by a solid line in FIG. 11B, and falls hot water down from the lower end of the rib 28, which makes it possible to scatter hot water over the coffee powder to the last, thereby enabling extraction of tasty coffee.

Warm air entering the circulation chamber 34 from the container housing case 41 travels, as shown in FIG. 2, through space between the inner surface of the container housing case 41 and the decanter 40 along the peripheral surface of the decanter 40, where air flow is unified by the straightening vane 55, and unified air goes into the circulation chamber 34 and back to fan 35 to circulate. The warm air heats the decanter 40, which properly keeps coffee liquid stored inside warm. Warm air blown into the container housing case 41 from the circulation chamber 34 is maintained at approximately 80 degrees in the present invention by switching ON/OFF of the air heater 36 based on the temperature detected by the temperature sensor 38 attached to the radiation fin 37 of the air heater 36.

Figure 16:
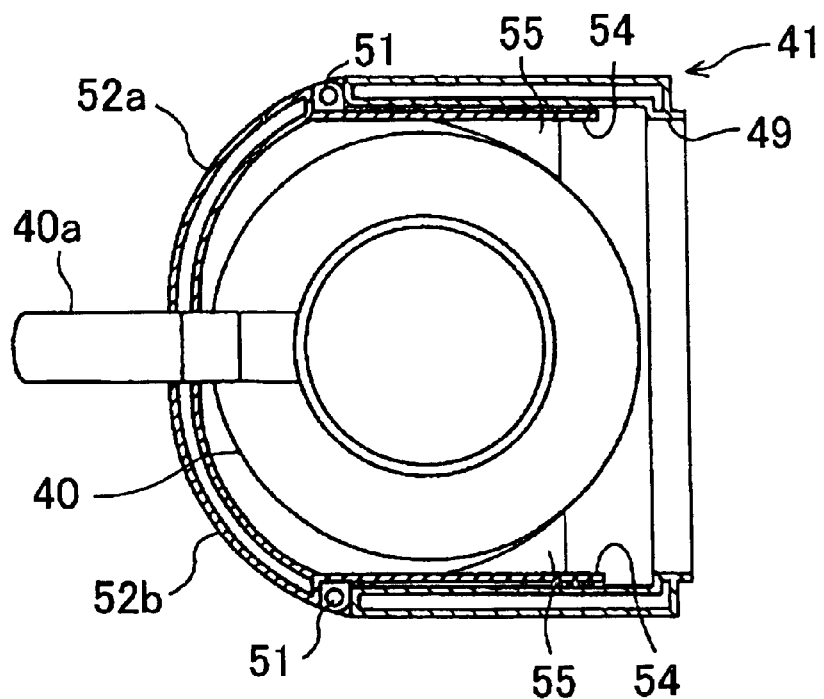
FIG. 16 is a horizontal cross sectional view showing the coffee extraction apparatus of FIG. 1 with a door of the container housing case being closed.
Figure 17:
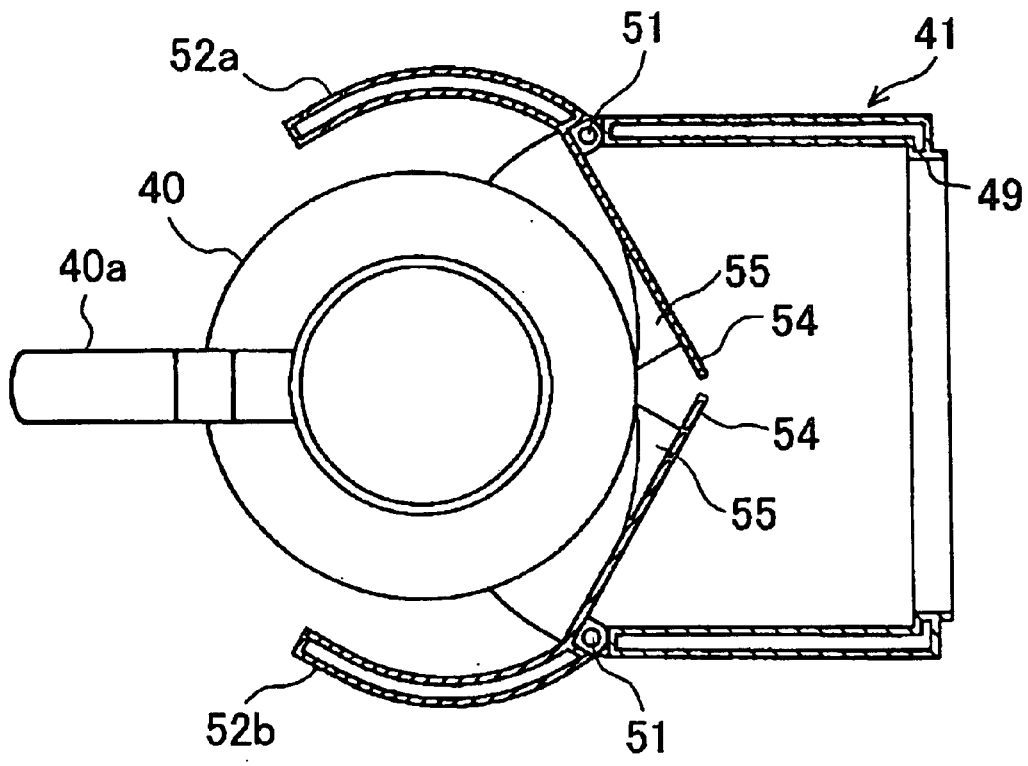
FIG. 17 is a horizontal cross sectional view showing the coffee extraction apparatus of FIG. 1 with a door of the container housing case being opened.

For putting the decanter 40 out of the container housing case 41, the grip 40*a* protruding beyond the container housing case 41 is held and dragged forward as shown in FIG. 16. Consequently, as shown in FIG. 17, a pair of the right and left doors 52*a*, 52*b* is pushed by the decanter 40 and opened, which makes the decanter 40 ready to be put out of the container housing case 41. For putting the decanter 40 in the container housing case 41, the decanter 40 is inserted into the container housing case 41 by pressing the decanter 40 against the inner door 54 between the opened doors 52*a*, 52*b*. Thus, the decanter 40 is easily put in and out of the container housing case 41 with the decanter 40 being held.

It is noted that waste water in the water boiler tank 7 is drained with use of a valve 59 through a tube 58 connected to the bottom of the water boiler tank 7 and extended to the bottom of the base portion 2 of the main body 1.

In the coffee extraction apparatus, when the fan 35 halts for some reason, air flow in the circulation chamber 34 is lost and the temperature of the radiation fin 37 of the air heater 36 rises. In this case, the temperature sensor 38 provided on the radiation fin 37 detects the temperature rise and turns the air heater 36 off, which prevents abnormal heat generation of the air heater 36 and secures safety.

In addition, when water starts to flow down from the feedwater tank 4 to the water boiler tank 7, the temperature of the water boiler tank 7 detected by an unshown temperature sensor provided on the water boiler tank 7 starts to drop. In this point of time, the LED light 32*d* indicating extraction is lit. After the lapse of specified time expected to be taken for replacing all the hot water with water, the water boiler heater 6 is turned on. This saves installation of additional sensor for detecting completion of hot water flow out.

For use of siphonage, the water boiler tank 7 is required to be placed at a high level, and therefore the lower area of the conventional water boiler tank 7 makes a dead space in the main body 1. In the present invention, however, the circulation chamber 34 is provided in the dead space and the fan 35 and the air heater 36 are disposed therein, which prevents the main body 1 from becoming larger. In addition, the conventional drink extraction apparatus is provided with a heat retention plate on the decanter mounting portion, and thereby increases the height of the main body. In the present invention, the heat retention plate is removed, so that the height of the main body 1 is decreased thereby.

Figure 18:
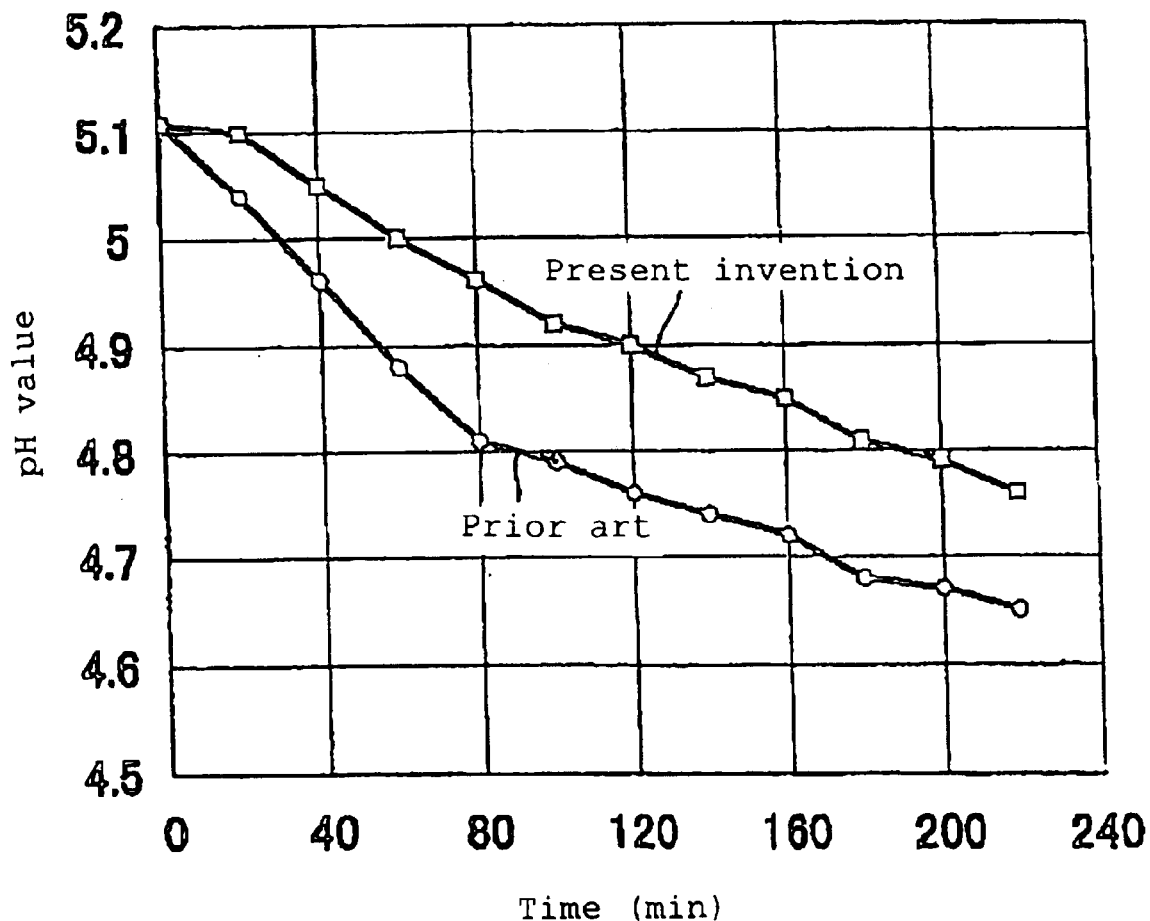
FIG. 18 is a graph showing a measurement result of degradation level of coffee in a warm air circulation method of the present invention and in a heat retention plate method of the prior art expressed by pH values.

FIG. 18 shows a result of measurement and comparison of degradation level of coffee kept warm in a warm air circulation method of the present invention and in a heat retention plate method of the prior art expressed by pH values. As a result, it was confirmed that degradation level is smaller in the warm air circulation method according to the present invention.

Figure 19:
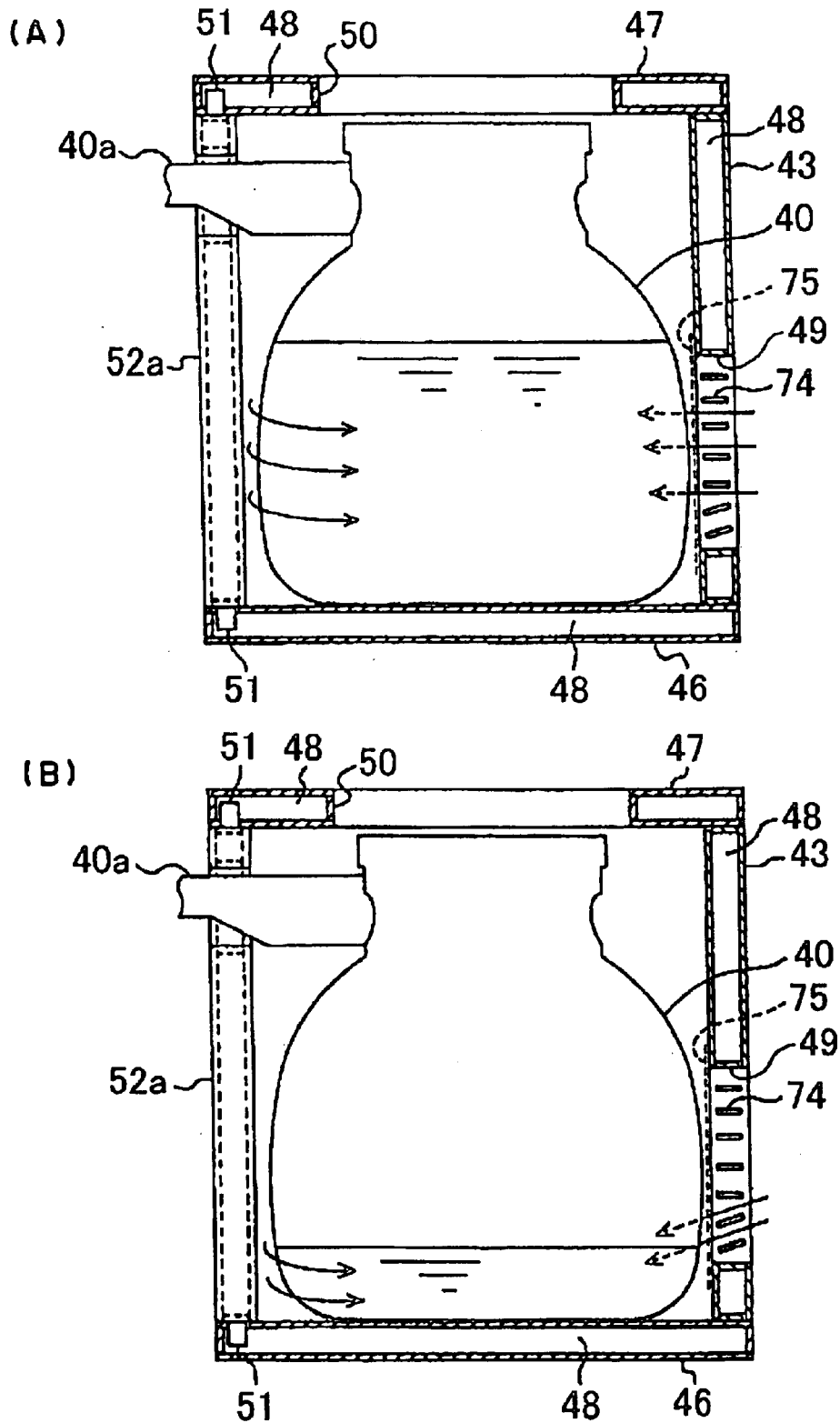
FIGS. 19A and 19B, showing a modified example with a louver provided on an air outlet, are enlarged cross sectional views showing the heat retention states of a decanter in a heat retention chamber when the amount of coffee liquid is large and small.

FIG. 19 shows modification of the coffee extraction apparatus of the present invention shown in FIG. 1. In the opening portion 49 on the rear-side wall 43 of the container housing case 41, there are provided plural rows of horizontal louvers 74 in vertical direction. As shown in FIGS. 19A and 19B, the lower louvers 74 are provided diagonally and the upper louvers 74 are provided in approximately horizontal direction. A net 75 is attached to the opening portion 49.

Warm air is blown out from the opening portion 49 not only through the upper louvers 74 in horizontal direction but also through the lower louvers 74 in downward direction. Accordingly, as shown in FIG. 19A, if an amount of coffee liquid in the decanter 40 is large, the decanter 40 is uniformly heated from periphery by warm air, which prevents generation of convection current in the coffee liquid inside and decreases frequency of contact of the coffee with air, thereby enabling heat retention of tasty coffee for a long period of time without damaging flavor. Also as shown in FIG. 19B, if an amount of coffee liquid in the decanter 40 is small, warm air blown out in downward direction implements proper heat retention, thereby preventing the coffee from being boiled down.

Figure 20:
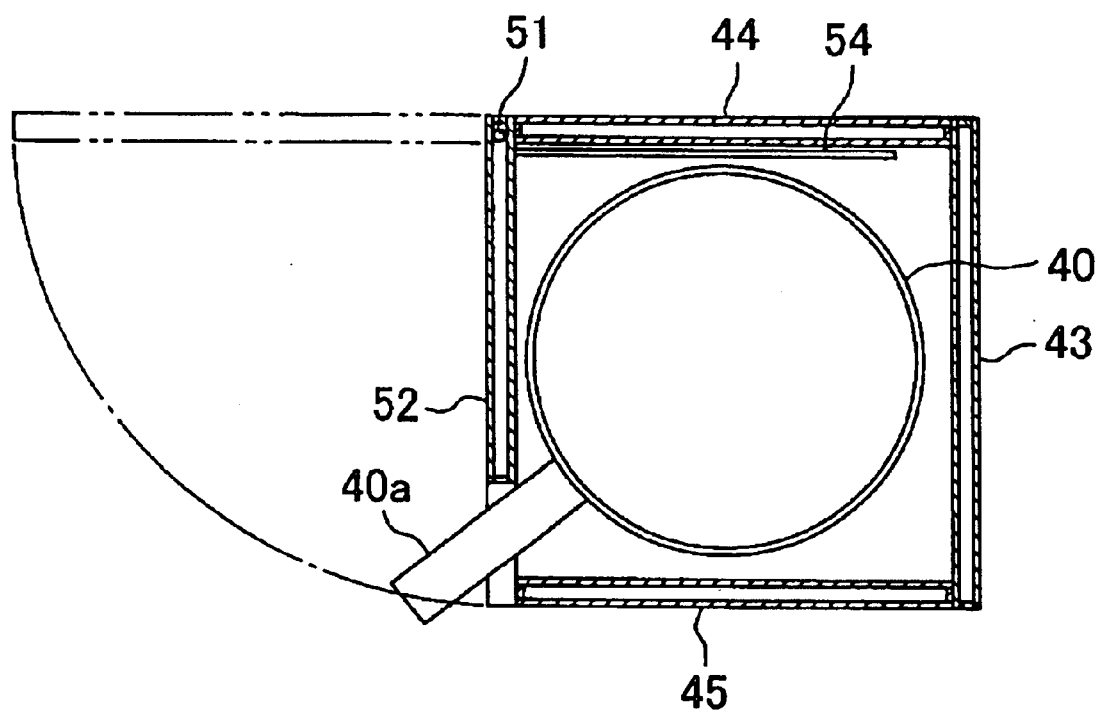
FIG. 20 is a cross sectional view showing another embodiment of the container housing case.

Although in the embodiment, the container housing case 41 is opened and closed in a biparting manner by a pair of the right and left doors 52*a*, 52*b*, it may be opened and closed by a single wing door like a door 52 shown in FIG. 20. Also, the doors 52*a*, 52*b* may be structured to be opened and closed in vertical direction, in the case of which the upper door 52*a* needs to be pressed in opening direction by a spring and the like so as to prevent the upper door 52*a* from closing by self-weight when the container 40 is put out.

Although in the embodiment of the container housing case 41, the inner door 54 has a board shape, it may be formed in the shape of a rod extending rectangularly from the vicinity of the rotation axis 51 to the rotation axis 51. In short, the inner door 54 may take any shape if the peripheral surface of the container 40 may come into contact therewith when the container 40 is put in and out.

Further, in the coffee extraction apparatus of the embodiment, there may be provided sensors such as switches for detecting presence of the decanter 40, or micro switches and optical switches for detecting opening of the doors 52*a*, 52*b* of the container housing case 41, so that the sensors may detect the decanter 40 out of the container housing case 41 and stop the fan 35. This prevents escape of warm air from the container housing case 41.

Further, the present invention is not limited to the apparatuses for keeping coffee warm like the coffee extraction apparatus of the embodiment, but is applicable to the apparatuses for feeding cold drink such as water and juice and keeping it cool.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A drink extraction apparatus comprising:
   a drink extraction portion;
   a drink container for storing drink extracted by the drink extraction portion;
   a heat retention chamber surrounding the drink container said heat retention chamber being composed of a lateral wall surrounding a peripheral surface of the drink container;
   a bottom wall for receiving a bottom surface of the drink container;
   an upper wall having an opening portion for covering a top of the drink container and for extracted drink falling from the drink extraction portion to the drink container;

a fan for supplying air to the heat retention chamber for air circulation; and a heater for heating air supplied to the heat retention chamber by the fan to make warm air, the warm air heating the drink container to keep the drink therein warm.

2. The drink extraction apparatus as defined in claim 1, wherein on the lateral wall there are formed an air outlet for blowing out air sent from the fan toward the heat retention chamber, and an air inlet for sucking air in the heat retention chamber and returning the air to the fan.

3. The drink extraction apparatus as defined in claim 2, wherein part of the air blown out from the air outlet is directed toward a lower side of the drink container.

4. The drink extraction apparatus as defined in claim 1, wherein part of the lateral wall is made of a door for locating the drink container in and out.

5. The drink extraction apparatus as defined in claim 4, wherein the door is composed of a pair of biparting right and left doors.

6. The drink extraction apparatus as defined in claim 5, wherein an opening portion for exposing a grip of the drink container outside is formed in the joint portion of the pair of the right and left doors.

7. The drink extraction apparatus as defined in claim 1, wherein at least a lateral wall of the heat retention chamber has a heat insulation structure.

8. The drink extraction apparatus as defined in claim 7, wherein the heat insulation structure is composed of an air layer.

9. The drink extraction apparatus as defined in claim 1, further comprising a temperature sensor for detecting the temperature of the air supplied to the heat retention chamber, and a control unit for turning on and off the heater based on the temperature detected by the temperature sensor to control the temperature of air in the heat retention chamber.

10. The drink extraction apparatus as defined in claim 9, wherein the temperature sensor is attached to a radiation fin provided on the heater or in the vicinity of the radiation fin.

11. The drink extraction apparatus as defined in claim 4, wherein the door is mounted rotatably around a rotation axis, an inner door is extensively provided in the vicinity of the rotation axis of the door so as to protrude inside a container housing case when the door is closed and to cover an opening portion of the container when the door is opened, and a notch is provided on the door for allowing the grip of the container to protrude outside.

12. The container housing case as defined in claim 11, wherein the inner door is in a cylinder shape.

13. The container housing case as defined in claim 11, wherein the inner door is in a board shape.

14. The drink extraction apparatus as defined in claim 1, wherein a straightening vane is provided on the lateral wall for guiding air to flow along the periphery of the container.

15. The drink extraction apparatus as defined in claim 1, wherein the drink extraction portion is composed of:

a feedwater tank;

a water boiler tank having a heater;

a feedwater pipe for connecting the water boiler tank and the feedwater tank;

a bucket provided above the drink container for accommodating extract; and a discharge pipe for discharging hot water from the water boiler tank into the bucket, the heat retention chamber being provided under the bucket, and the fan and the heater being provided behind the heat retention chamber and under the water boiler tank.

16. The drink extraction apparatus as defined in claim 15, wherein the drink extraction portion is further composed of a steam pipe extending to an upper side from the water boiler tank and protruding inside the feedwater tank, the feedwater tank has an opening opened upwardly for receiving water, a water receiving cover having a perforated portion for allowing received water to pass therethrough is mounted in a demountable way on the feedwater tank so as to cover the opening of the feedwater tank, and the water receiving cover is provided with a small chamber opened downwardly for covering an upper side of the steam pipe.

17. The drink extraction apparatus as defined in claim 16, wherein above the perforated portion of the water receiving cover, a filter for filtering received water is disposed.

18. The drink extraction apparatus as defined in claim 16, wherein a recessed portion is provided on the water receiving cover to form the perforated portion on a bottom of the recessed portion.

19. The drink extraction apparatus as defined in claim 16, wherein a leg portion extending downside is provided on the peripheral verge of the water receiving cover, and a lower end of the leg portion is brought into contact with a bottom of the feedwater tank.

20. The drink extraction apparatus as defined in claim 19, wherein an engagement groove extending in the vertical direction is provided on an outer surface of the leg portion of the water receiving cover, and a protruding bar, for engaging with the engagement groove, is provided in a protruding way on a lateral wall of the feedwater tank.

21. The drink extraction apparatus as defined in claim 20, wherein the engagement groove is formed to have a width narrowed toward a lower side.

22. The drink extraction apparatus as defined in claim 20, wherein an opening verge of the engagement groove is provided with a protruding portion that is tightly fitted into the protruding bar.

23. The drink extraction apparatus as defined in claim 19, wherein an engagement protruding portion is provided on an outer surface of the leg portion of the water receiving cover, and a protrusion for engaging with the engagement protruding portion is provided in a protruding way on a lateral wall of the feedwater tank.

* * * * *